(12) United States Patent
Bettis et al.

(10) Patent No.: US 7,701,929 B2
(45) Date of Patent: Apr. 20, 2010

(54) DISTRIBUTED TELECOMMUNICATIONS ARCHITECTURE PROVIDING REDUNDANT GATEWAYS AND IP DEVICE INTEGRATION

(75) Inventors: Sonny R. Bettis, Lawrenceville, GA (US); Jon S. Plotky, Lawrenceville, GA (US); Ian M. Moraes, Suwanee, GA (US); Philip L. Lowman, Ellijay, GA (US); James H. Spencer, Tucker, GA (US)

(73) Assignee: Movius Interactive, Duluth, GA (US)

( * ) Notice: Subject to any disclaimer, the term of this patent is extended or adjusted under 35 U.S.C. 154(b) by 1224 days.

(21) Appl. No.: 11/170,530

(22) Filed: Jun. 29, 2005

(65) Prior Publication Data

US 2006/0013200 A1 Jan. 19, 2006

Related U.S. Application Data

(60) Provisional application No. 60/584,117, filed on Jun. 30, 2004, provisional application No. 60/584,070, filed on Jun. 30, 2004, provisional application No. 60/584,445, filed on Jun. 30, 2004, provisional application No. 60/584,444, filed on Jun. 30, 2004, provisional application No. 60/584,270, filed on Jun. 30, 2004, provisional application No. 60/584,067, filed on Jun. 30, 2004, provisional application No. 60/584,394, filed on Jun. 30, 2004, provisional application No. 60/584,058, filed on Jun. 30, 2004, provisional application No. 60/584,079, filed on Jun. 30, 2004, provisional application No. 60/584,312, filed on Jun. 30, 2004, provisional application No. 60/584,393, filed on Jun. 30, 2004, provisional application No. 60/584,310, filed on Jun. 30, 2004, provisional application No. 60/584,046, filed on Jun. 30, 2004, provisional application No. 60/584,114, filed on Jun. 30, 2004, provisional application No. 60/584,311, filed on Jun. 30, 2004, provisional application No. 60/584,430, filed on Jun. 30, 2004, provisional application No. 60/584,068, filed on Jun. 30, 2004, provisional application No. 60/584,313, filed on Jun. 30, 2004.

(51) Int. Cl.
H04L 12/66 (2006.01)

(52) U.S. Cl. .................. 370/354; 370/410; 370/524

(58) Field of Classification Search ............... 370/352, 370/354, 410, 524
See application file for complete search history.

(56) References Cited

U.S. PATENT DOCUMENTS

| 6,981,263 | B1 | 12/2005 | Zhang et al. |
| 7,286,524 | B1 * | 10/2007 | Loftus ..................... 370/354 |
| 7,477,646 | B1 * | 1/2009 | Peterson et al. .......... 370/401 |
| 2001/0036173 | A1 * | 11/2001 | Shmulevich et al. ..... 370/352 |
| 2002/0031145 | A1 * | 3/2002 | Christie et al. ........... 370/469 |

(Continued)

Primary Examiner—Seema S Rao
Assistant Examiner—Sai-Ming Chan
(74) Attorney, Agent, or Firm—Gregory Scott Smith

(57) ABSTRACT

A telecommunications platform that provides redundant interfaces to a telecommunications system for multiple IP based telecommunication devices. The telecommunications platform includes a gateway cluster with two or more signaling gateways. Each signaling gateway is assigned a point code for being accessed by devices in the telecommunications system. The gateway cluster is assigned a virtual point code. Any of the IP based telecommunications devices can be accessed by the telecommunications system by routing to the virtual point code through one of the signaling gateways in the gateway cluster. Thus, if one of the signaling gateways is not available, the IP based telecommunications devices can still be accessed through one of the other signaling gateways in the gateway cluster.

15 Claims, 3 Drawing Sheets

U.S. PATENT DOCUMENTS

| | | |
|---|---|---|
| 2003/0161296 A1 | 8/2003 | Butler et al. |
| 2003/0169779 A1* | 9/2003 | Craig ......................... 370/522 |
| 2004/0032862 A1 | 2/2004 | Schoeneberger et al. |
| 2004/0090954 A1 | 5/2004 | Zhang et al. |
| 2004/0120502 A1 | 6/2004 | Strathmeyer et al. |
| 2005/0141552 A1* | 6/2005 | Schwalb ..................... 370/466 |

* cited by examiner

DISTRIBUTED TELECOMMUNICATIONS ARCHITECTURE PROVIDING REDUNDANT GATEWAYS AND IP DEVICE INTEGRATION

CROSS-REFERENCE TO RELATED APPLICATIONS

This application claims the benefit of the filing dates of, and incorporates by reference, the following U.S. Provisional Applications for Patent:

Ser. No. 60/584,117 entitled DISTRIBUTED IP ARCHITECTURE FOR TELECOMMUNICATIONS SYSTEM, filed on Jun. 30, 2004;

Ser. No. 60/584,070 entitled AUTO BLOCK AND AUTO DISCOVERY FUNCTIONS, filed on Jun. 30, 2004;

Ser. No. 60/584,445 entitled IMPROVED COMPONENT PERFORMANCE USING DMA DATA TRANSFERS, filed on Jun. 30, 2004;

Ser. No. 60/584,444 entitled VXML BASED TELEPHONE SERVICE SYSTEM, filed on Jun. 30, 2004;

Ser. No. 60/584,270 entitled MESSAGE DURABILITY FOR VOICE MESSAGING SYSTEM, filed on Jun. 30, 2004;

Ser. No. 60/584,067 entitled AUDIO CHUNKING, filed on Jun. 30, 2004;

Ser. No. 60/584,394 entitled DISTRIBUTED TELECOMMUNICATIONS PLATFORM, filed on Jun. 30, 2004;

Ser. No. 60/584,058 entitled MEDIA SERVER, filed on Jun. 30, 2004;

Ser. No. 60/584,079 entitled SIGNALING GATEWAY, filed on Jun. 30, 2004;

Ser. No. 60/584,312 entitled DOCUMENT SERVER, filed on Jun. 30, 2004;

Ser. No. 60/584,393 entitled NEXT GENERATION TELEPHONE PLATFORM, filed on Jun. 30, 2004;

Ser. No. 60/584,310 entitled TS SELECT, filed on Jun. 30, 2004;

Ser. No. 60/584,046 entitled MESSAGE DURABILITY AND RETRIEVAL, filed on Jun. 30, 2004;

Ser. No. 60/584,114 entitled HEALTH MONITOR SUBSYSTEM, filed on Jun. 30, 2004;

Ser. No. 60/584,311 entitled SOFTWARE REQUIREMENTS SPECIFICATION: CDMS CHANGES FOR FRED, filed on Jun. 30, 2004;

Ser. No. 60/584,430 entitled ARCHITECTURE INFRASTRUCTURE FOR THE DOCUMENT SERVER AND TELEPHONY SERVER OF FRED, filed on Jun. 30, 2004;

Ser. No. 60/584,068 entitled ARCHITECTURE DESIGN DOCUMENT: NEXT GENERATION MESSAGE STORE PROJECT, filed on Jun. 30, 2004; and Ser. No. 60/584,313 entitled FAX MESSAGE STORING, filed on Jun. 30, 2004; and this application is related to, and incorporates by reference, U.S. patent application Ser. No. 11/080,744 entitled DISTRIBUTED IP ARCHITECTURE FOR TELECOMMUNICATIONS SYSTEM filed on Mar. 15, 2005.

BACKGROUND OF THE INVENTION

The present invention relates to distributed IP systems and telecommunication systems and, more particularly, to a multi-functional telecommunications system with geographically dispersible components that interact over a distributed IP architecture.

Over the past several decades, voice mail has continued to expand and establish itself as a key element in the successful operations of most businesses. The typical voice mail system today can take on a variety of forms, including a computer card that can operate within a personal computer that is connected to a businesses telephone system, or a computer card or component that is directly integrated into the businesses telephone system, or as a service provided by a telecommunications company.

The common ingredient to each of the voice mail systems available today is that the components that make up the voice mail system must communicate with each other and thus, must be co-located. This can be a great disadvantage for companies that have geographically dispersed offices.

In today's global economy, even small business may have a need for multiple offices for serving clients, interacting with vendors, or various other reasons. The advent of the Internet, email and video conferencing helps to allow such dispersed operations appear more seamless. However, a significant problem that still exists for dispersed offices is having a common telephonic system that operates as a single, co-located system but serves the needs of the various offices. Generally, each office purchases and maintains its own telephone system without any direct interface between the telephone systems of the various offices and without any central control. This can be a costly endeavor in that duplicative hardware must be purchased and maintained at each site. In addition, the logistics of inter-office communication such as call transfers, voice mail retrieval etc. can be complex. Thus, there is a need in the art for a telecommunications system that allows seamless integration for remotely located offices.

In addition, even if a seamless integration of a telephone system is obtained, there still exists a need for personalization of the telephone systems in the various offices. For instance, if the offices are located in different time zones, it may be important to have the ability for each office to uniquely set up the system for handling incoming calls, switching the system to night or weekend mode, entering or deleting individuals from the system etc. Thus, there is a need in the art for a distributed telephone system that provides seamless integration, while at the same time allowing components of the system to be individually programmed and/or maintained at the remote offices.

By incorporating IP technology into a distributed telecommunications platform, additional complexities are encountered. One complexity is that components on the IP side of the telecommunications system cannot communicate directly with the telecommunications network unless they also incorporate a SS7 protocol stack. The industry has addressed this need in the art by utilizing the SIGTRAN protocol between an SS7 gateway and IP based devices. This allows the IP based devices to talk over the SS7 telecommunications network without having to include a full SS7 protocol stack within the IP devices.

Another necessity in modem day telecommunications systems is the deployment of redundancy on critical elements. Adding redundancy in any complex network setting can give rise to many technical hurdles that must be overcome for a successful deployment. One such need in the art is a technique to provide redundancy in a gateway that allows IP based devices to talk over the SS7 telecommunications network. The present invention is directed at such a solution.

BRIEF SUMMARY OF THE INVENTION

The present invention is directed towards the deployment of redundant gateways within a distributed telecommunications system to provide an interface for IP devices to communicate over an SS7 network. The distributed telecommunications system provides functionality that is typical of what is required in most modern small or large business settings, such as call forwarding, auto-attendant, voice mail, voice messaging, etc. The telecommunications system is made up of several components that can be located in various locations that are remote from each other. Each of the components includes an interface to an IP network such as the Internet. A single component or class of components (signaling gateway) interfaces to a switched telephone network using the signaling system seven (SS7) protocol. Each of the other components in the telecommunications system that would require such an interface to the switched telephone network simply communicates through the signaling gateway.

Each component in the telecommunication system communicates with the other components through the IP network. This advantageously allows the components to be geographically dispersed yet to operate as a single, seamless telecommunications system.

More particularly, one embodiment of the present invention includes redundant signaling gateways, media servers, one or more application servers and one or more central message and data stores. The signaling gateways include a signaling interface to a telephone network, such as an SS7 interface and an interface to an IP network. The media server includes a circuit-switched interface to the telephone network for receiving and initiating telephone services over the telephone network. The media server also includes an interface to the IP network. The media server operates to provide communication services, such as voice mail, voice messaging, voice-based menus, etc to callers and subscribers over circuit switched connections through the telephone network.

Each of the signaling gateways is assigned a point code, as is require in order to interface to the SS7 network. In addition, the pair of signaling gateways is also assigned a virtual point code. The virtual point code is registered with the telecommunications network and traffic being routed to a circuit identification code (CIC) associated with that CIC can be routed to either of the redundant signaling gateways. If one of the signaling gateways goes off-line, the other signaling gateway can handle all traffic for the virtual point code. In addition, the signaling gateways can instruct the telecommunications network to avoid certain CICs that are controlled by an off-line or failed media server.

The media server operates closely in conjunction with the application server and communicates with the application server over the IP network. The media server receives requests for services and then, request the provision of those services through the application server. The application server provides the functionality for providing various communication servers to callers and subscribers. The central data and message store provides configuration information that is used to control the operation of the communication services provided by the application server.

In operation, a media server, located at a first location, may receive a request for a communications service. The request for a communications service can take on a variety of forms including, but not limited to receiving an incoming call, receiving a request for a call origination, receiving a menu selection of a voice-based menu. The media server responds to the request by either invoking or calling up an application from the application server. Depending on the particular embodiment of the invention, the application server can simply provide the application to the media server to render, or can be partially or entirely rendered by the application server. In rendering the communications service, the central data and message store may be accessed to obtain particular configuration or customization information pertaining to the provision of the communications service. While the communications service is being provided, the media server may receive additional feedback from a calling party or subscriber and the application will respond correspondingly. For instance, the communications service may include a voice mail function. In this case, the application will prompt a calling party to leave a voice message. The voice message can then be received and stored in the central data and message store. Other features, capabilities and advantages of the present invention are more fully described with reference to the figures and the detailed description.

BRIEF DESCRIPTION OF THE SEVERAL VIEWS OF THE DRAWING

Various aspects, features and advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The present invention provides a distributed IP architecture, also described as a next-generation communications platform, for telecommunications equipment, such as a PBX, voicemail system, or the like, with redundant gateways to provide an interface to the SS7 telecommunications network for the IP based devices. By utilizing the architecture of the present invention, the various functionalities of the telecommunications equipment can be divided amongst various physical components and the physical components can be geographically dispersed. Each of the components communicates with each other, as needed, through independent interfaces to an IP network. The complexities of interfacing to the telephone network are handled through the single gateway components and a simplified protocol is used for communication between the remaining components of the telecommunications equipment or to the telephone network through the gateway component.

Now turning to the drawings, in which like labels refer to like elements throughout the several views, various aspects and features of the present invention are described.

Figure 1:
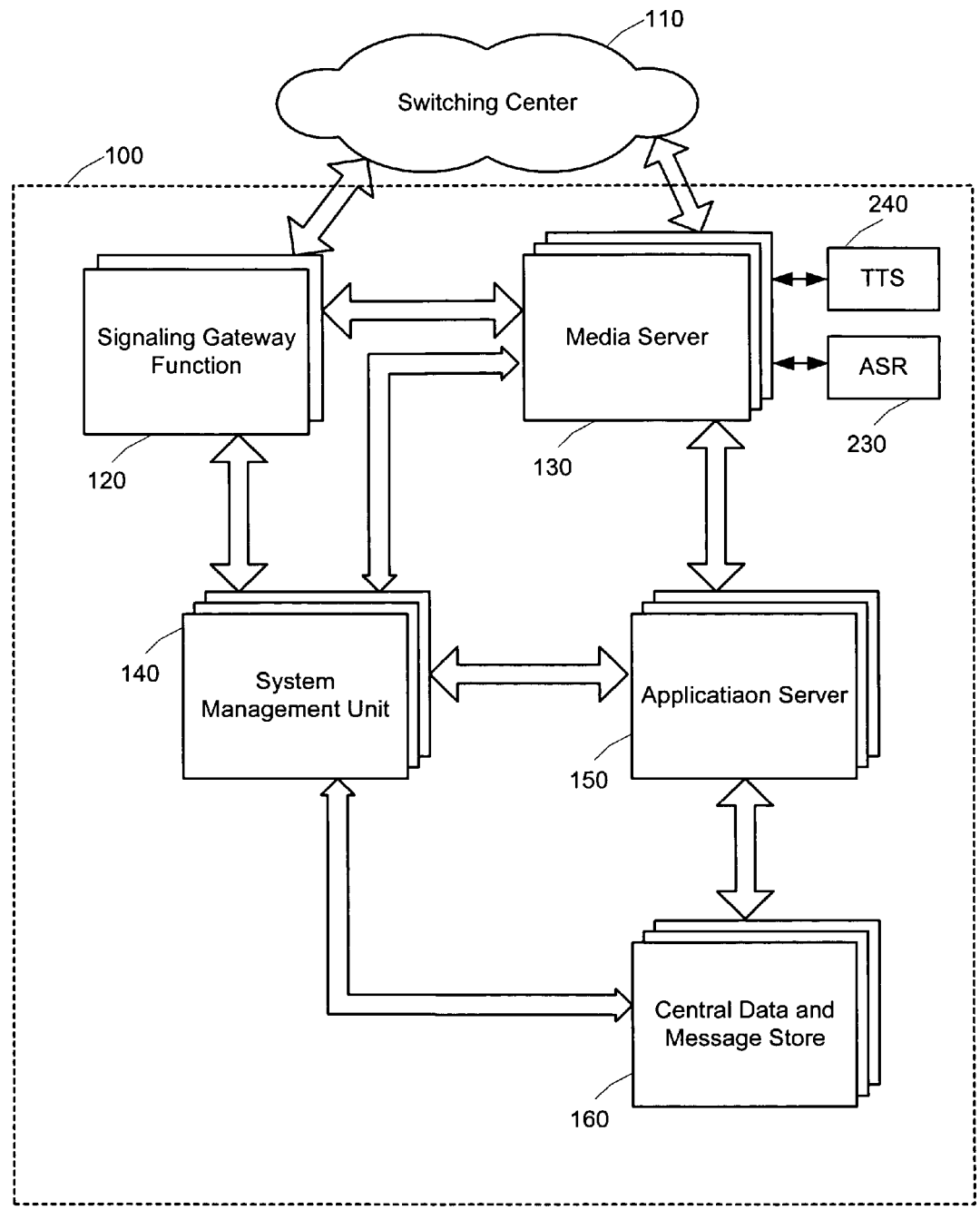
FIG. 1 is a system diagram illustrating the components and the connectivity of an exemplary next-generation communications platform suitable as an environment for the present invention.

FIG. 1 is a system diagram illustrating the components and the connectivity of an exemplary next-generation communications platform of the present invention. One aspect of the present invention is a distributed IP-based architecture for telecommunications equipment that, among other things, can provide telecommunication services such as voice mail, call forwarding and other telecommunication features. In the illustrated embodiment, the next-generation communications platform 100 has a distributed IP architecture and is connected to a telecommunications network, such as the Public Switched Telephone Network (PSTN) or the Mobile Network, through a switching center 110. The communications platform 100 is illustrated as including one or more signaling gateway functions (SGF) 120, one or more media servers (MS) 130, one or more system management units (SMU) 140, one or more application servers (AS) 150 and one or more central data and message store (CDMS) 160. It should be understood that the distribution of functionality illustrated in the figures and described, although having novel aspects in itself, is not the only acceptable arrangement, and aspects of the present invention could be incorporated into a system that includes fewer or more components and a different arrangement of functionality among the components.

In general, each SGF 120 serves as a Signaling System 7 (SS7) interface to the PSTN 110 and allows one or more components or sub-systems to share the same point code (thereby reducing the need for destination point codes (DPC) and signaling links for call-control. This makes the telephonic system appear as single trunk group in the network; however, sharing the same point code does not necessarily mean that all the trunks are in a single trunk group. The media servers 130 terminate IP and/or circuit switched traffic from the PSTN via a multi-interface design and is responsible for trunking and call control. The application server modules 150 generate dynamic VoiceXML pages for various applications, renders the pages through the media server 130 and provides an external interface via a web application server configuration. The SMU 140 is a management portal that enables service providers to provision and maintain subscriber accounts and manage network elements from a centralized web interface. The CDMS 160 stores voice messages, subscriber records, and manages specific application functions including notification. Each of these sub-systems are described in more detail following.

Each of the components in the next-generation communications platform is independently scalable and independently interconnected onto an IP network. Thus, the components can be geographically distributed but still operate as a single communications platform as long as they can communicate with each other over the IP network. This is a significant advantage of the present invention that is not available in state-of-the-art communication systems.

Signaling Gateway Function (SGF). Each SGF 120 offers a consolidated signaling interface creating a single virtual SS7 signaling point for the next generation communications platform. SS7 provides the extra horsepower networks need, whether large or small. A SIGTRAN interface (IETF SS7 telephony signaling over IP) to the multi-function media server 130 as well as IP Proxy functions are supported via the SGF 120. Consolidating SS7 into a single component (in this case the SGF 120) of the next-generation communications platform provides the benefits of reduced point codes, cost efficiency in the design of the other components and easier maintenance.

Each signaling point or component that interfaces to the SS7 network is uniquely identified by a numeric point code. Point codes are carried in signaling messages exchanged between signaling points to identify the source and destination of each message. Each signaling point in the telecommunications network uses a routing table to select the appropriate signaling path for each message.

There are three kinds of signaling points in the SS7 network: SSP (Service Switching Point), STP (Signal Transfer Point) and SCP (Service Control Point). SSPs are switches that originate, terminate or tandem calls. An SSP sends signaling messages to other SSPs to setup, manage and release voice circuits required to complete a call. An SSP may also send a query message to a centralized database (an SCP) to determine how to route a call (e.g., a toll-free 1-800/888 call in North America). An SCP sends a response to the originating SSP containing the routing number(s) associated with the dialed number. An alternate routing number may be used by the SSP if the primary number is busy or the call is unanswered within a specified time. Actual call features vary from network to network and from service to service.

Network traffic between signaling points may be routed via a packet switch called an STP. An STP routes each incoming message to an outgoing signaling link based on routing information contained in the SS7 message. Because it acts as a network hub, an STP provides improved utilization of the SS7 network by eliminating the need for direct links between signaling points. An STP may perform global title translation, a procedure by which the destination signaling point is determined from digits present in the signaling message (e.g., the dialed 800 number, calling card number or mobile subscriber identification number).

An STP can also act as a "firewall" to screen SS7 messages exchanged with other networks. Because the SS7 network is critical to call processing, SCPs and STPs are usually deployed in mated pair configurations in separate physical locations to ensure network-wide service in the event of an isolated failure. Links between signaling points are also provisioned in pairs. Traffic is shared across all links in the link set. If one of the links fails, the signaling traffic is rerouted over another link in the link set. The SS7 protocol provides both error correction and retransmission capabilities to allow continued service in the event of signaling point or link failures.

The availability of point codes is limited and can be very expensive. The consolidation of signaling links eases the pressure on these resources or eliminates the need for additional point codes all together. Thus, the consolidated signaling interface in the SGF 120 provides immediate network simplification and cost savings. The redundant SGFs 120 presents the appearance of a single identity to the SS7 network via the single "virtual" point code of the messaging network and recognizes and processes messages in a transparent manner. The SGF 120 can potentially reduce the maximum number of point codes needed in some cases from 50 to only three.

From a networking perspective, each SGF 120 looks like an STP to the rest of the network giving access to the various components of the next-generation communications platform through the use of the single virtual point code. Thus use of redundant SGFs introduce multiple paths to the various components of the next-generation communications platform are available.

Each SGF 120 shares a common virtual point codes that is used to access the various components in the communications platform. This virtual point code is the only destination point code necessary for the entire communications platform. The SGFs communicate with each other to synchronize the CICs and IP devices, such as the media servers and other components integrated into the communications platform, that are associated with the virtual point code. Thus, if one SGF fails, access to the communications platform is easily provided through the other SGF.

This is significantly different and advantageous over each of the components in the next generation communications platform looking like synchronized SS7 stacks.

In an exemplary embodiment, the SGF 120 server supports N+1 fail over redundancy schemes and load sharing configurations and is built on an Intel server. A minimum of two SGFs is recommended for load sharing and redundancy purposes for increased availability.

Media Server (MS). The MS 130 terminates IP traffic from the SGF 120 and circuit-switched traffic from the PSTN 110. The MS 130 is responsible for call set up and control within the platform architecture. The MS 130 processes input from the user in either voice, DTMF format or other signaling scheme (much like a web client gathers keyboard and mouse click input from a user). The MS 130 then presents the content back to the user in voice form (similar in principle to graphic and text displayed back to the user on a PC client). This client/server methodology is important in the platform architecture in that it enables rapid creation of new applications and quick utilization of content available on the World Wide Web. The client/server architecture also is the primary enabler for the ability of the system to be geographically distributed.

The MS 130 processes incoming calls via requests to the AS 150 using HTTP. A load balancer preferably directs traffic arriving at the multi-function MS 130 to one of a plurality of ASs 150. This functionality ensures that traffic is allocated evenly between active servers. The multi-function MS 130 works as the VoiceXML client on behalf of the end user in much the same manner as a client like Netscape works on behalf of an HTML user on a PC. A VoiceXML or CCXML browser residing on a multi-function media server interprets the VoiceXML documents for presentation to users.

VoiceXML is a standards-based scripting language for developing voice-enabled software applications. This means that developers use and leverage Web-based (HTML) development expertise in developing speech-based telephony applications.

Application Server (AS). The modular design of the next-generation communications platform has the added advantage that it is easy to deploy enhanced services, such as voice dialing and voice navigation, unified communications solutions, multimedia messaging services, and presence & availability management applications. Adding applications to the platform is accomplished via the addition of standard application servers 150 to the common platform.

Each application server 150 generates application documents (VoiceXML pages) in response to requests from the media server 130 via the internal Ethernet network. The application server 150 leverages a web application infrastructure to interface with back-end data stores (messages stores, user profile databases, content servers) to generate the VoiceXML based documents.

The overall web application infrastructure separates the core service logic (i.e., providing the business logic) from the presentation details (VoiceXML, CCXML, SALT, XHTML, WML) to provide a more extensible application architecture. The application server 150 utilizes Java 2 Enterprise Edition (J2EE) environment and Java Server Pages (JSP) to create the dynamic VoiceXML pages for the multi-function media server. Combining these technologies enables rapid incorporation of Speech Application Language Tags (SALT) to provide interoperability (multimodal) between applications like WAP, HTML, XHTML and voice—allowing the end user to simultaneously input data via voice command and receive presentation via WAP or HTML.

To create an environment for easy application development, the application server 150 preferably supports Template+JSPs. Applications are implemented in JSPs using an API for access to messaging functions. These JSPs are readily modifiable making changes in application behavior and creation of new applications very easy.

The cooperation of the media server 130 and the application server 150 allows for customization of certain features to be offered to particular subscribers. For instance, if a company has one office on the west coast and another office on the east coast, the operation of the telephone system, particularly the media server 130 and the application server 150 for each office may be quite different. For instance, the voice mail system and auto attendant may go to night-time mode in the east coast office at 6:00 PM Easter Time and at the west coast office at 6:00 PM Pacific Time. In addition, the menu structure and prompts provided by the various offices may be substantially different. For instance, a dial by name directory would include different employees. With the present invention, separate media servers can be located at the two offices and the media servers 130 can render different communication services. The different communication services could be rendered from different application servers 150, co-located with the media servers 130, or through a common application server that can serve a communications services application based on the location or an ID of the media server 130.

In addition, remotely located media servers 130 can provide common functionality to the various subscribers and callers as well as provide a seamless integration of the telephone system from the perspective of both the subscribers and users. A company may want to present a voicemail and auto attendant interface that seamlessly serves all locations of the company. The present invention can be utilized to provide such functionality. The application server 150 can render a tiered dial by name or menu selection function that first allows callers to select an office and then, an application server 150 and/or media server 130 invokes a particular function to provide dial by name services for that particular office. Alternatively, the application server 150 may maintain access to a single CDMS 160 or multiple CDMSs 160 that include all of the subscriber information for all offices of the company. The application server 150 can then provide a single level menu structure for a company wide dial by name directory.

Common Database and Message Store (CDMS). The next-generation communications platform uses the CDMS 160 to store voice/audio messages, subscriber records, and to manage certain application functions such as notification schedules. The CDMS 160 is preferably designed with fully redundant components and utilizes reflective memory and Redundant Array of Independent Disks (RAID) technology for fault tolerance, immediate fail over and recovery. This ensures five 9's availability for associated hardware and software components. Essential disk drive and RAID controller components are preferably "hot swappable" eliminating the need to power down the system for replacements. With the CDMS 160, performance is optimized for the unique characteristics of voice messaging, eliminating the performance degrading, unnecessary e-mail-centric database functionality that comes with the searching and sorting of e-mail stores.

The CDMS 160 can utilize standard of the shelf e-mail storage systems. The message store is abstracted through the use of Java middleware that allows the selection of the message store to be transparent to the application, enabling each message type to be stored in the most efficient store possible.

System Management Unit (SMU). The SMU 140 provides a centralized point for service providers to manage all network elements, providing remote access, maintenance, and backup functionality. The SMU 140 provides a single interface for provisioning, alarming, reports, and subscriber migration. The SMU 140 integrates and customizes systems with new elements and applications, and provides operational support and network management functions for carriers experiencing swiftly growing networks and exploding traffic volumes. Core features of the SMU component include:

Element Auto-Discovery—when service providers add new network elements, the SMU automatically recognizes them and includes the new elements in the graphical network map.

Graphical Network Map—a network/cluster map and map editor provides a snapshot of the entire network or cluster and facilitates quick problem identification and resolution.

Time Synchronization—a central time source ensures all network components maintain a uniform time reference across the entire messaging network—important for any distributed architecture.

Centralized network logging—logging for the entire messaging network is centralized on the SMU 140.

The SMU 140 uses a dual processor computer and allows remote dial-in for access to the SMU 140 server as well as all other servers in the system via Telnet. Backup of system configurations and other critical data can also accomplished via the SMU.

Figure 2:
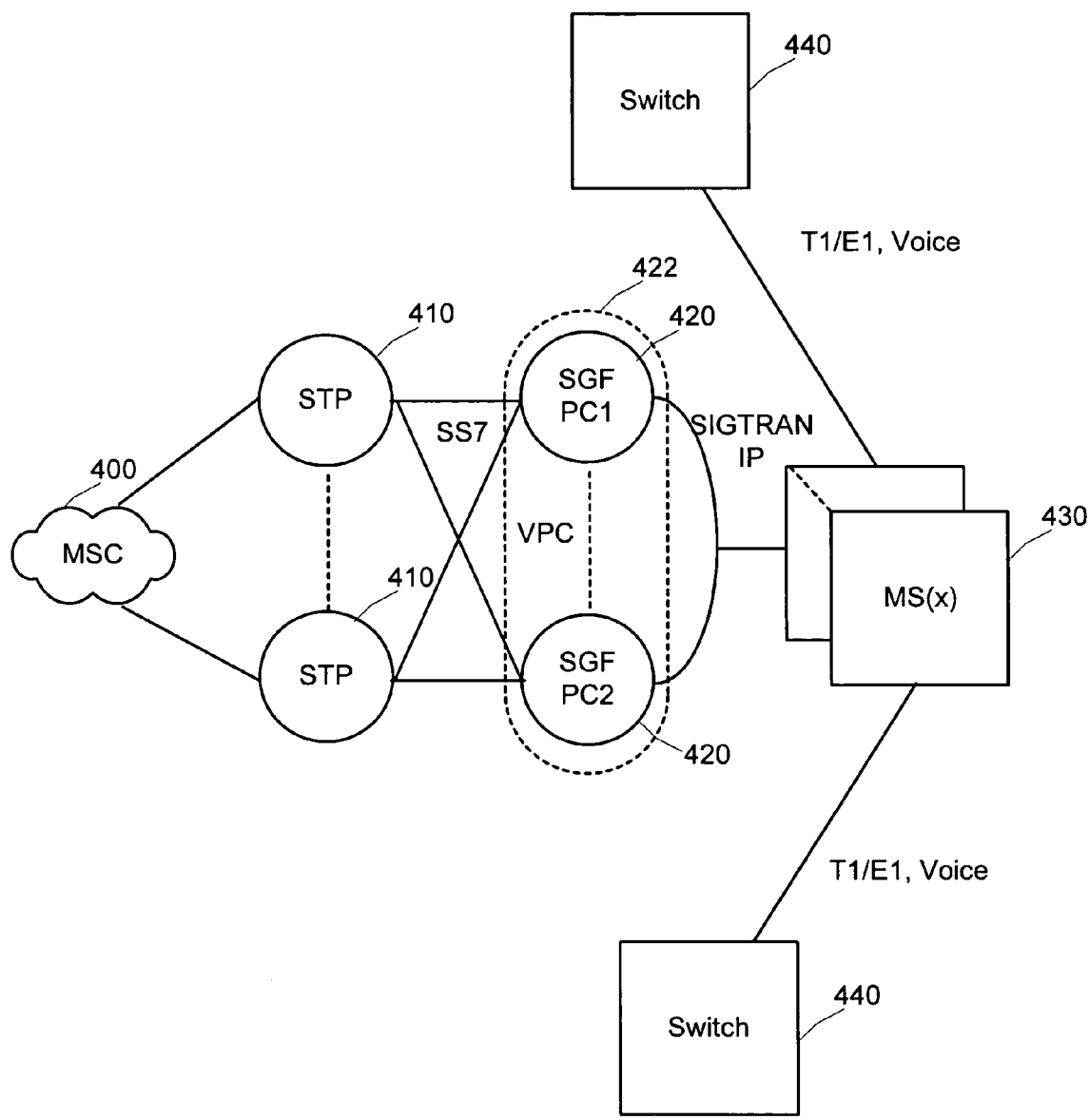
FIG. 2 is a block diagram illustrating the redundant signaling gateway interfaces to the SS7 telecommunications network in accordance with an embodiment of the present invention.

FIG. 2 is a block diagram illustrating the redundant signaling gateway interfaces to the SS7 telecommunications network in accordance with an embodiment of the present invention. A telecommunications network is interfaced with a mobile switching center MSC 400. The MSC 400 interfaces with switching points STP 410 that are connected within the telecommunications network. Two signaling gateways 420 are provided in accordance with the present invention. Each of the STPs 410 can communicate with either of the SGFs 420 and the communication is performed using SS7. It should be appreciated that the illustrated components are a simplification for the purposes of conveying the inventive concept. In actuality, the network will include many more STP's 410 and the telecommunications platform employing the redundant SGFs 420 can actually utilize more than two.

The SGFs 420 interface to the Media Servers 430 over an IP network using SIGTRAN. Call setup information directed towards a particular CIC is directed to one of Media Servers 430 that is utilizing the identified CIC. The Media Servers 430 connect to switches 440 within the telecommunications network over voice lines, such as T1 or E1 lines, that include one or more CICs.

The SGFs are provisioned with a point code as is required for being connected to the SS7 telecommunications network. Each SGF registers periodically with the telecommunications network to identify their existence and the point code assigned to them. In the illustrated embodiment, the SGFs 420 are assigned point codes PC1 and PC2. The redundant SGF cluster 422 is assigned a virtual point code VPC. Each of SGF 420 in the cluster also registers the VPC as an adjacent switching point. Thus, the various switching points in the network have the VPC listed in their routing table, along with the following paths to access the VPC: PC1-VPC and PC2-VPC.

Each Media Server 430 that is connected to the SGF cluster 422 is connected to one or more CICs. The Media Servers 430 notifies the SGFs 420 regarding the CICs for which they are provisioned. This information is also included in the telecommunication network routing tables. Thus, the routing tables identify the VPC assigned to the SGF cluster 422 as being the point code for routing traffic to any of the CICs that are handled by the Media Servers 430 connected to the SGF cluster 422. As a result, the VPC points to a large number of CICs.

Figure 3:
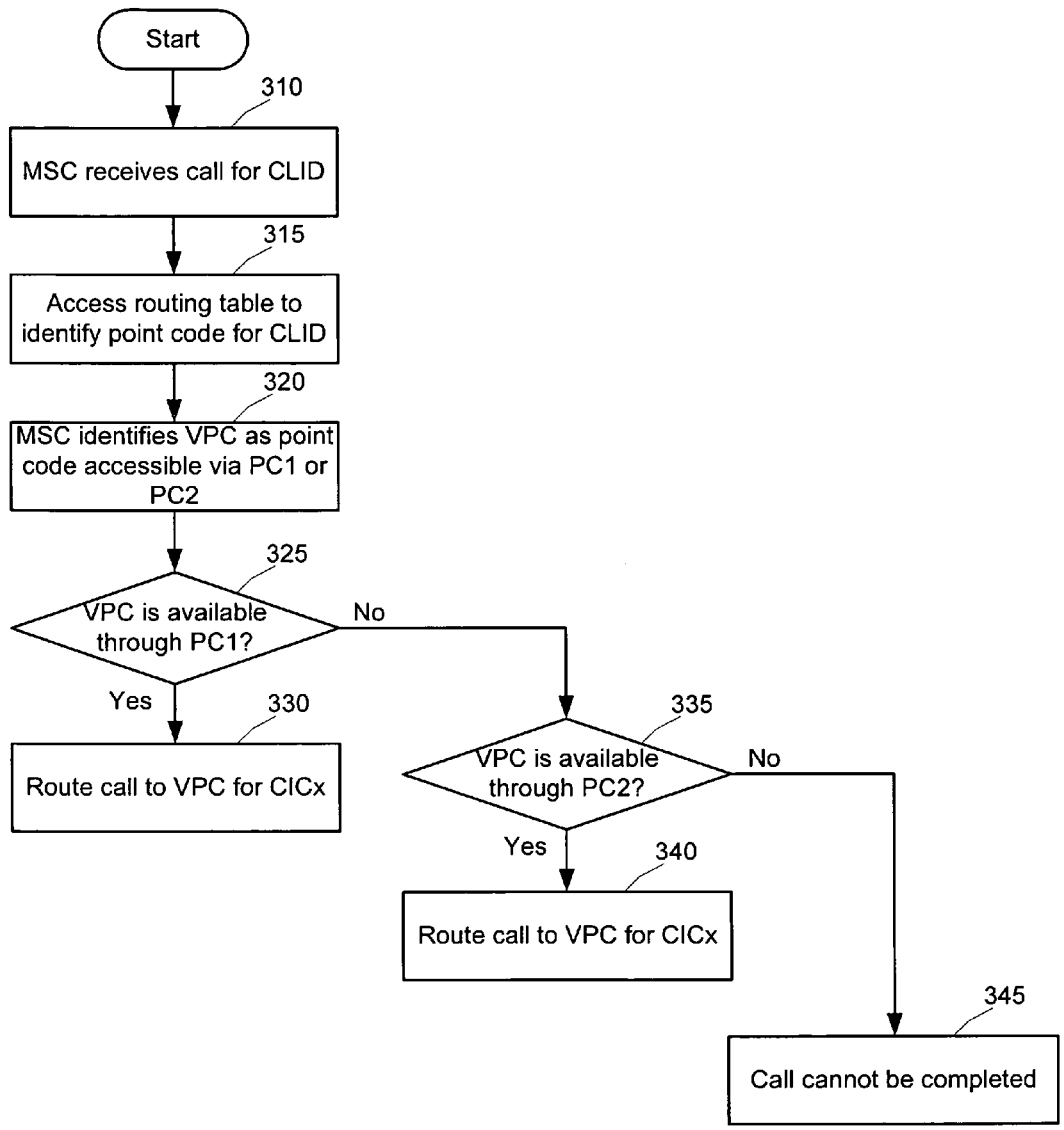
FIG. 3 is a flow diagram illustrating the operation of the distributed telecommunications platform employing a redundant SGF cluster and an IP SIGTRAN interface to various devices.

FIG. 3 is a flow diagram illustrating the operation of the distributed telecommunications platform employing a redundant SGF cluster and an IP SIGTRAN interface to various devices. At step 310, the MSC or switching center 110 receives a call setup request that is directed towards a particular telephone number or called line identifier CLID_1. The call setup request is simply being provided as an example and those skilled in the art will appreciate that the present invention is equally applicable to a variety of telecommunications services. To route the call, or telecommunication service, associated with the call setup request, the point code associated with the CLID is identified by accessing the routing table 315. For the network illustrated in FIG. 2, CLID_1 is assigned to a CIC that is connected to the SGF cluster 422. Thus, an entry in the routing tables identifies VPC as the destination point code for the call, and identifies the range of CICs associated with that VPC. In addition, the routing table identifies the path that can be used to access VPC 320. In the illustrated network, VPC can be accessed through PC1 or PC2. At step 325, the MSC determines if PC1 and VPC are accessible. If so, a CIC associated with the VPC is selected and the call setup request is routed to the VPC 330. If VPC cannot be reached through PC1, the MSC determines if VPC can be reached through PC2 335. If so, a CIC associated with the VPC is selected and the call setup request is routed to the VPC 340. If the VPC cannot be reached through PC2, then the call cannot be setup 345.

Thus, it has been shown that among other things, the present invention includes a distributed telecommunications platform that allows for multiple IP based devices to be incorporated into the platform, provides redundancy for accessing the telecommunications platform through an SGF cluster, and provides access to each component of the distributed telecommunications platform through a reduced number of point codes, one point code for each SGF in the cluster and a virtual point code.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A distributed telecommunications platform providing redundancy and integration of IP based devices, the distributed telecommunications platform comprising:

at least two signaling gateways to pass data between an SS7 telecommunications network and a packet switched network, wherein each signaling gateway includes a signaling interface to an STP of the telecommunications network and an IP interface to one or more other components in the telecommunications system, further each signaling gateway is assigned a point code for being accessed in the telecommunications network and the combination of signaling gateways is assigned a virtual point code, further each signaling gateway registers its point code with the telecommunications system and to register the virtual point code as an adjacent switching point;

at least one telecommunications server, wherein each telecommunications server includes a circuit-switched interface for terminating circuit-switched traffic over the telecommunications network and that is associated with a set of circuit identification codes, and further, each telecommunications server includes an IP interface for interfacing to the signaling gateways through an IP network, each telecommunications server being configured to provide communication services to subscribers and to notify the signaling gateways with regards to the circuit identification codes associated with the telecommunications server such that the telecommunications network maintains routing information that identifies all of the circuit identification codes associated with the virtual point code.

2. The distributed telecommunications platform of claim 1, wherein a telecommunications service directed to a particular telephone number can be routed to the distributed telecommunications platform through the virtual point code.

3. The distributed telecommunications platform of claim 2, wherein the telecommunications service can be directed to the virtual point code through any of the active signaling gateways.

4. The distributed telecommunications platform of claim 3, wherein prior to directing the telecommunications service to the virtual point code, a switch within the telecommunications system that is directing the telecommunications service first determines if a signaling gateway is active.

5. The distributed telecommunications platform of claim 1, wherein the telecommunications server is operable to interface to the telecommunications network through one of the signaling gateways.

6. A method for providing redundant interfaces to a telecommunications system for a plurality of IP based devices, the method comprising the steps of:
    assigning a point code to each gateway in a gateway cluster, wherein each gateway passes data between an SS7 telecommunications network and a packet switched network and, further, includes a signaling interface to an STP of the telecommunications system and an IP interface;
    registering each point code with the telecommunications system;
    assigning a virtual point code to the gateway cluster;
    registering the virtual point code with the telecommunications system;
    connecting a plurality of IP based telecommunication devices to the gateway cluster through an IP network;
    receiving telecommunications traffic at the gateway cluster from the telecommunications system, the telecommunications traffic being directed to the virtual point code through one of the signaling gateways in the gateway cluster and being associated with a particular IP based telecommunication device; and
    routing the telecommunications traffic to the particular IP based telecommunication device.

7. The method of claim 6, wherein one or more of the IP based telecommunication devices is associated with a set of circuit identification codes, and wherein the step of routing the telecommunications traffic includes routing the telecommunications traffic to the particular IP based telecommunication device associated with a particular circuit identification code.

8. The method of claim 6, wherein prior to the step of receiving telecommunications traffic at the gateway cluster from the telecommunications system, the telecommunications system inquires whether the virtual point code is available through a first signaling gateway of the gateway cluster and routes the telecommunications traffic to the virtual point code through the first signaling gateway if it is available.

9. The method of claim 8, wherein if the first signaling gateway is not available, the telecommunications system inquires whether the virtual point code is available through a second signaling gateway of the gateway cluster and routes the telecommunications traffic to the virtual point code through the second signaling gateway if it is available.

10. The method of claim 6, wherein if one of the signaling gateways in the gateway cluster is not available, the telecommunications system can route the telecommunications traffic to one of the other signaling gateways in the gateway cluster.

11. A communications platform comprising:
    a gateway cluster that includes a plurality of signaling gateways, wherein each signaling gateway passes data between an SS7 telecommunications network and a packet switched network and, further, includes an interface to an STP of a telecommunications system and an interface to an IP network, a registered virtual point code being assigned to the gateway cluster and each of the plurality of signaling gateways including a point code;
    a plurality of IP based telecommunications sewers that interface to the telecommunications system through a voice circuit and through an IP interface to the gateway cluster;
    the communications platform being configured to:
        receiving telecommunications traffic directed to a circuit identification code associated with a first particular one of the plurality of IP based telecommunications devices, that is directed to said virtual point code, wherein the circuit identification codes associated with the plurality of IP based telecommunications devices are associated with the virtual point code;
        verify that the first particular IP based telecommunications device is available; and
        route the telecommunications traffic to the first particular IP based telecommunications if it is available, otherwise instructing the telecommunications system to direct the traffic to an alternate circuit identification code.

12. The communications platform of claim 11, wherein the interface to the telecommunications system is signaling system 7.

13. The communications platform of claim 12, wherein the IP interface is SIGTRAN.

14. The communications platform of claim 11, wherein telecommunications traffic directed to the virtual point code can be routed through any of the plurality of signaling gateways in the gateway cluster.

15. The communications platform of claim 14, wherein prior to routing telecommunications traffic to the virtual point code, the telecommunications system identifies an available signaling gateway within the gateway cluster that is available and then routes the telecommunications traffic to the virtual point code through that available signaling gateway.

* * * * *